(12) United States Patent
Overbeek et al.

(10) Patent No.: US 9,505,943 B2
(45) Date of Patent: Nov. 29, 2016

(54) AQUEOUS BIO-RENEWABLE VINYL POLYMER COMPOSITION

(75) Inventors: Gerardus Cornelis Overbeek, Waalwijk (NL); Tijs Nabuurs, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 446 days.

(21) Appl. No.: 13/995,738

(22) PCT Filed: Dec. 20, 2011

(86) PCT No.: PCT/EP2011/073439
§ 371 (c)(1),
(2), (4) Date: Nov. 18, 2013

(87) PCT Pub. No.: WO2012/084973
PCT Pub. Date: Jun. 28, 2012

(65) Prior Publication Data
US 2014/0058031 A1    Feb. 27, 2014

(30) Foreign Application Priority Data

Dec. 20, 2010 (EP) .................................... 10195932

(51) Int. Cl.
| | | |
|---|---|---|
| *C09D 133/12* | (2006.01) | |
| *C08F 265/06* | (2006.01) | |
| *C08L 33/12* | (2006.01) | |
| *C09D 151/06* | (2006.01) | |
| *C09J 151/06* | (2006.01) | |
| *C08L 51/06* | (2006.01) | |
| *C09D 11/106* | (2014.01) | |
| *C08F 220/18* | (2006.01) | |

(52) U.S. Cl.
CPC ........... *C09D 133/12* (2013.01); *C08F 265/06* (2013.01); *C08L 33/12* (2013.01); *C08L 51/06* (2013.01); *C09D 11/106* (2013.01); *C09D 151/06* (2013.01); *C09J 151/06* (2013.01); *C08F 220/18* (2013.01)

(58) Field of Classification Search
CPC . C09D 133/12; C09D 151/06; C09D 11/106
USPC .................................. 524/460, 521; 523/201
See application file for complete search history.

(56) References Cited

U.S. PATENT DOCUMENTS

| | | | | |
|---|---|---|---|---|
| 5,859,112 A | * | 1/1999 | Overbeek | ............. C08F 265/04 523/201 |
| 5,962,571 A | * | 10/1999 | Overbeek | ................. C08F 8/30 428/460 |
| 2009/0246430 A1 | | 10/2009 | Kriegel et al. | |

FOREIGN PATENT DOCUMENTS

| | | |
|---|---|---|
| EP | 0 949 307 | 10/1999 |
| FR | 2 943 351 | 9/2010 |
| WO | WO 95/29944 | 11/1995 |
| WO | WO 95/29963 | 11/1995 |
| WO | WO 2010/125276 | 11/2010 |

* cited by examiner

*Primary Examiner* — Kelechi Egwim
(74) *Attorney, Agent, or Firm* — Nixon & Vanderhye P.C.

(57) ABSTRACT

An aqueous polymer coating composition comprising at least: a vinyl polymer A having a wt average molecular wt Mw within the range of from 1,000 to 150,000 g/mol and an acid value >5 mgKOH/g; and a vinyl polymer B having a molecular wt Mw of at least 80,000 g/mol and an acid value <35 mgKOH/g; wherein I) the wt % of olefinically unsaturated monomers used to form polymer A and polymer B are in the ratio of 5:70 to 95:30 and add up to 100%; II) at least 20 wt % of at least one of polymer A and or polymer B is derived from at least one bio-renewable olefinically unsaturated monomer.

15 Claims, No Drawings

AQUEOUS BIO-RENEWABLE VINYL POLYMER COMPOSITION

This application is the U.S. national phase of International Application No. PCT/EP2011/073439 filed 20 Dec. 2011 which designated the U.S. and claims priority to EP 10195932.8 filed 20 Dec. 2010, the entire contents of each of which are hereby incorporated by reference.

The present invention relates to an aqueous vinyl polymer coating composition wherein at least 10% by weight (preferably at least 20 wt % of the monomer composition used to make the vinyl polymer is derived from at least one bio-renewable olefinically unsaturated monomer; processes for the production of such an aqueous vinyl polymer composition and to their use in coating applications.

There is an ever increasing demand to replace or supplement solvent-based polymer coating compositions with aqueous-based counterparts due to the environmental toxicity and flammability problems posed by the use of volatile organic solvents. However, even where aqueous-based polymer compositions have been devised, their production has usually entailed the intermediate use of organic solvents, requiring subsequent removal, or the incorporation of a certain amount of a solvent in the final composition which acts to ensure proper film-formation on coating (known as a coalescing solvent). There is therefore also now increasing pressure to significantly reduce or eliminate the volatile organic contents (VOC) in aqueous-based polymer composition syntheses.

In addition, even if one can achieve a solvent-free aqueous polymer coating composition, it has been found difficult to achieve one with a balance of good properties conventionally required in most coating compositions, particularly acceptably high hardness and low minimum film forming temperature (MFFT) of the resulting coating. The coating should also have good water and solvent resistance.

Furthermore there is an increasing demand to use bio-renewable monomers in order to improve the sustainability of the polymers used in for example coating applications. In view of concerns about depletion of fossil fuel resources or an increase in carbon dioxide in the air that poses a global-scale environmental problem in recent years, methods for producing raw materials of these polymers from biomass resources have attracted al lot of attention. Since these resources are renewable and therefore have a carbon-neutral biomass, such methods in particular are expected to gain importance in the future.

EP0758364 (=WO95-29963) discloses a process for making organic solvent-free aqueous cross-linkable polymer composition comprising an acid-functional polymer A with Tg 10 to 125° C. and having cross-linker functional groups and a polymer B having Tg at least 25° C. below that of polymer A in combination with a crosslinking agent having an advantageous balance of MFFT and Koenig hardness. EP0758347 (=WO95-29944) discloses a process for making organic solvent-free aqueous cross-linkable polymer composition comprising an acid-functional polymer A with Tg less than 50° C. and having cross-linker functional groups and a polymer B having Tg at least 25° C. above that of the polymer A in combination with a crosslinking agent having an advantageous balance of MFFT and Koenig hardness.

WO 2010-125276 (Arkema) describes producing acrylic ester (co)polymers from an esterified acrylic acid by polymerising the ester in a liquid phase to form a viscous polymeric liquid therein which is separated using a thin film method. This process is stated to be especially suitable for making copolymers that contain carbon from renewable sources.

US 2003-035869 (Li Xiawei) describes an method for identifying for purely natural products (such as traditional Chinese medicine) by measuring the percentage of $^{14}C$ in the specimen by means of a liquid flashing arithmometer.

None of the above-discussed disclosures teaches a vinyl polymer coating composition having the selected combination of features and integers as defined in the invention below and an advantageous combination of properties as discussed above, utilising bio-renewable monomers to make the vinyl polymer.

We have now invented an aqueous vinyl polymer coating composition with an advantageous combination of MFFT and hardness and which furthermore is prepared at least in part from bio-renewable monomers.

According to the present invention there is provided an aqueous vinyl polymer coating composition comprising at least:
  a) a vinyl polymer A, comprising:
    i) 1 to 45 wt % of acid-functional olefinically unsaturated monomers;
    ii) 0 to 20 wt % of crosslinking-functional olefinically unsaturated monomers; and
    iii) 99 to 50 wt % of non-acid functional, non-crosslinking monomers selected from the group consisting of olefinically unsaturated monomers and arylalkylene monomers;
    the weight percentages of each of (a)(i), (a)(ii) and (a)(iii) are calculated based on the total of (a)(i)+(a)(ii)+(a)(iii)=100%; and where said polymer A having a weight average molecular weight within the range of from 1,000 to 150,000 g/mol and an acid value >5 mgKOH/g; and
  b) a vinyl polymer B, comprising:
    i) 0 to 5 wt % of acid-functional olefinically unsaturated monomers;
    ii) 0 to 25 wt % of crosslinking-functional olefinically unsaturated monomers; and
    iii) 100 to 70 wt % of non-acid functional, non-crosslinking monomers selected from the group consisting of olefinically unsaturated monomers and arylalkylene monomers;
    where the weight percentages of each of (b)(i), (b)(ii) and (b)(iii) are calculated based on the total of (b)(i)+(b)(ii)+(b)(iii)=100%; and where said polymer B having a weight average molecular weight of at least 80,000 g/mol and an acid value <35 mg KOH/g, preferably <10 mg KOH/g; wherein
  I) the weight % of olefinically unsaturated and arylalkylene monomers used to form polymer A and polymer B when calculated based on the total amount of (a)(i)+(a)(ii)+(a)(iii)+(b)(i)+(b)(ii)+(b)(iii)=100% are in the respective ratio of 5:75 to 95:25, preferably of 5:70 to 95:30.
  II) at least 10%, preferably at least 20%, by weight of the total amount of monomers (a)(i)+(a)(ii)+(a)(iii)+(b)(i)+(b)(ii)+(b)(iii), used to form polymer A and polymer B is derived from at least one bio-renewable olefinically unsaturated monomer;
  III) the acid value of polymer A is greater than the acid value of polymer B by at least 10 mgKOH;
  IV) polymer A and polymer B have a glass transition temperature difference of at least 20° C.;
  V) polymer B is prepared in the presence of polymer A;

VI) said coating composition on drying has a Koenig hardness of at least 20 sec; and VII) said coating composition has a minimum film forming temperature of <55° C.

Preferably polymer A acts as a (co-)surfactant for the preparation of polymer B.

Preferably the wt % of olefinically unsaturated monomers used to form polymer A are 10 to 65 wt %, more preferably 15 to 60 wt % and especially 20 to 55 wt % by weight of the monomers used to form polymer A and polymer B.

In one embodiment of the invention the monomers used to prepare vinyl polymer A consists of monomer(s) selected from a(i), optionally a(ii) and/or a(iii) (i.e. polymer A is formed from no other monomers).

In another embodiment of the invention the monomers used to prepare vinyl polymer B consists of monomer(s) selected from optional b(i), optional b(ii) and/or b(iii) (i.e. polymer B is formed from no other monomers).

In a further embodiment of the invention the monomers used to prepare vinyl polymer A consists of monomer(s) selected from a(i), optionally a(ii) and/or a(iii) and the monomer(s) used to prepare vinyl polymer B consists of monomers selected from optional b(i), optional b(ii) and/or b(iii) (i.e. polymers A and B are formed from no other monomers).

Preferably the wt % of olefinically unsaturated monomers used to form the polymer B are 90 to 35 wt %, more preferably 85 to 40 wt % and especially 80 to 45 wt % by weight of the monomers used to form polymer A and polymer B.

Preferably at least 30 wt %, more preferably at least 50 wt %, and especially 70 wt % of the monomer composition used to form polymer A and polymer B is derived from at least one bio-renewable olefinically unsaturated monomer. Bio-renewable monomers may be obtained fully or in part from bio-renewable sources. Thus it is preferred to also measure the carbon-14 content to determine the biorenewability.

The content of carbon-14 (C-14 or $^{14}C$) is indicative of the age of a bio-based material. It is known in the art that C-14, which has a half life of about 5,700 years, is found in bio-renewable materials but not in fossil fuels. Thus, "biorenewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

The term biorenewable materials as used herein preferably means materials where the level of carbon-14 (14C) isotopes in the material is comparable to the mean level of 14C in atmospheric $CO_2$ (e.g. as measured by ASTM D6866). Comparable as used herein means the value is within +/−6% of the value of the reference sample (described herein or in the standard test method used), more preferably within +/−5%, most preferably within +/−4%.

The percentage differences for comparable properties herein refer to fractional differences between the material tested and the reference where the property is measured in the same units in the same way (i.e. if the value to be compared is also measured as a percentage it does not denote an absolute difference).

More preferred biorenewable materials are those comprising a minimum amount of the C-14 isotope such that the C-14 level in the material satisfies one or more of the values as described herein.

C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

Examples of bio-renewable monomers include but are not limited to bio-based acrylics obtained by for example using bio-derived alcohols such as bio-butanol and include (meth)acrylic acid and alkyl (meth)acrylate, where alkyl is preferably selected from methyl, ethyl, butyl or 2-ethylhexyl.

Acrylic acid can be made from glycerol, as is disclosed by Arkema, or from lactic acid as described by U.S. Pat. No. 7,687,661. Methacrylic acid can be prepared from ethene, methanol and carbon monoxide (all potentially bio-renewable), as disclosed by Lucite International Ltd.

Olefinically unsaturated bio-renewable monomers which may additionally provide a contribution to improved coating properties include α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; dialkyl itaconamides, mono alkyl itaconamides; furfuryl (meth)acrylate; fatty acid functional (meth)acrylates such as DAPRO FX-522 from Elementis and Visiomer® MUMA from Evonik.

Improved properties may include heat resistance, colloidal stability, pigment compatibility, surface activity, blocking resistance and reduced MFFT depending on the monomers used.

The monomer system used for the preparation of polymer A and polymer B is any suitable combination of olefinically unsaturated monomers which is amenable to copolymerisation (including the bio-renewable monomers described herein which may of course also be acid-functional, crosslinkable etc as described below).

Acid-functional olefinically unsaturated monomers (used in polymer A preferably in sufficient concentration to render the resulting polymer surface active) may be a monomer bearing an acid-forming group which yields, or is subsequently convertible to, an acid-functional group (such as an anhydride, e.g. methacrylic anhydride or maleic anhydride) or an acid.

Typically the acid-bearing co-monomers are carboxylfunctional (meth)acrylic monomers or other ethylenically unsaturated carboxyl bearing monomers such as acrylic acid, methacrylic acid, itaconic anhydride, methylene malonic acid, itaconic acid, crotonic acid and fumaric acid. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4^+$ or alkali metal salts of ethylmethacrylate-2-sulphonic acid or 2-acrylamido-2-methylpropane sulphonic acid, or the corresponding free acids.

Typically polymer A comprises 1 to 45 wt % of acid functional monomers, preferably 3 to 30 wt % and more preferably 3 to 20 wt %.

Polymer A may comprise polyethylene glycol (meth) acrylates or their methyl ether analogues that can render polymer A surface active. When copolymerising these monomers, a lower acid concentration can be applied, for example polymer A may then comprise 1 to 10 wt % of acid functional monomers.

Typically polymer B comprises less than 5 wt % of any acid functional monomers and preferably less than 2 wt %, and in some preferred embodiments none at all.

Polymer B may also comprise polyethylene glycol (meth) acrylates or their methyl ether analogues which may contribute to reducing the MFFT of the resulting composition.

Other, non-acid functional, non-crosslinking monomers which may be copolymerized with the acid monomers include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates, such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5-C12) cycloalkyl acrylates such as isobornyl acrylate and cyclohexylacrylate. Styrenics include styrene itself and the various substituted styrenes, such as alpha-methyl styrene and t-butyl styrene. Nitriles such as acrylonitrile and methacrylonitrile may also be polymerised, as well as olefinically unsaturated halides such as vinyl chloride, vinylidene chloride; vinyl fluoride and (meth)acrylamide.

Where present preferred non acid and non crosslinking functional arylalkylene monomers may comprise (optionally hydrocarbo substituted) styrene and conveniently the optional hydrocarbo may be $C_{1-10}$hydrocarbyl, more conveniently $C_{1-4}$alkyl. Suitable arylalkylene monomers are selected from: styrene, α-methyl styrene, vinyl toluene, t-butyl styrene, di-methyl styrene and/or mixtures thereof, especially styrene. Unless the context dictates otherwise reference to styrenics herein includes any suitable arylalkylene moiety.

Typically polymer A comprises 98.5 to 50 wt % of non acid functional, non-crosslinking monomers, preferably 96 to 65 wt %, and more preferably 96 to 75 wt %.

Functional monomers which impart crosslinkability (crosslinking monomers for short) include epoxy (usually glycidyl) and hydroxyalkyl (usually C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual and therefore for the purpose of this invention acid functional monomers are not considered as crosslinkable monomers although they may act as such.

In a preferred embodiment of the invention, the polymer dispersion of the invention contains dialkyl methylidene malonates as partially bio-renewable comonomer. The pH of the monomer feed and of the reactor phase is maintained acidic (i.e. pH<7, more preferred, however, pH<5, most preferred pH<4). Preferably, the dialkyl methylidene malonate concentration is at least 25% on total weight of solid polymer in the polymer dispersion. It is preferred that all dialkyl methylidene malonate monomer is co-polymerised in either the vinyl polymer A or vinyl polymer B.

In yet another preferred embodiment of the invention the reactor phase is buffered at pH>7, more preferred at pH>7.5, most preferred at pH>8, while the monomer feed is kept acidic, while the rest of the conditions apply as described above.

Preferably, polymer A comprises 0.5 to 20 wt %, more preferably 1 to 15 wt %, and especially 1 to 10 wt % of crosslinking monomers.

Polymer A preferably has a weight average molecular weight within the range of from 1500 to 100,000 g/mol, more preferably 2000 to 50,000 g/mol and particularly 3,000 to 40,000 g/mol.

The weight average molecular weight of polymer B is preferably more than 100,000 g/mol, and most preferably more than 150,000 g/mol. The upper limit does not usually exceed 5,000,000 g/mol.

Preferably the molecular weight of polymer A is lower than the molecular weight of polymer B, and most preferably there is a molecular weight difference of at least 30,000 g/mol and especially at least 50,000 g/mol.

Preferably the Tg difference between polymer A and polymer B is at least 40° C. and more preferably at least 60° C.

In one embodiment of the invention the Tg of polymer A is higher than that of polymer B and should then be in the range from 50 to 125° C. and particularly 70 to 125° C. The Tg of polymer B should then be at least 20° C. below, more preferably at least 40° C. below the Tg of polymer A. Preferably the Tg of polymer B will then be within the range of from −50 to 40° C. and more preferably from −30 to 30° C. and especially from −20 to 30° C.

In another embodiment of the invention the Tg of polymer A is lower than that of polymer B and should then be less than 50° C. and more preferably be in the range of from −15 to 49° C. Preferably the Tg of polymer B should then be in the range from 50 to 125° C. and particularly 70 to 125° C.

Polymer A may be formed using a number of processes. These include emulsion polymerisation, suspension polymerisation, bulk polymerisation and solution polymerisation. Such processes are extremely well known and need not be described in great detail.

In one embodiment emulsion polymerisation is used to form polymer A. Suffice to say that such an emulsion process involves dispersing the monomers in an aqueous medium and conducting polymerisation using a free-radical initiator (normally water soluble) and appropriate heating (e.g. 30 to 120° C.°) and agitation.

The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged to make polymer A. The aqueous emulsion polymerisation can employ conventional free radical initiators such as peroxides, persulphates and redox systems as are well known in the art. The amount of initiator used is generally 0.05 to 3% based on the weight of total monomers charged.

The aqueous emulsion polymerisation process may be carried out using an "all-in-one" batch process (i.e. a process in which all the components to be employed are present in the polymerisation medium at the start of polymerisation) or a semi-batch process in which one or more of the components employed (usually at least one of the monomers), is wholly or partially fed to the polymerisation medium during the polymerisation. Although not preferred, fully continuous processes could also be used in principle. Preferably a semi-batch process is employed in the preparation of the hydrophilic polymer A.

The polymerisation technique employed must of course be such that a low molecular polymer (as defined) is formed, e.g. by employing a chain transfer agent such as one selected from mercaptans (thiols), certain halohydrocarbons and alpha-methyl styrene; or catalytic chain transfer polymerisation using for example cobalt chelate complexes as is quite conventional. Alternatively a controlled radical polymerisation process can be used, for instance by making use of an appropriate nitroxide or a thiocarbonylthio compounds such as dithioesters, dithiocarbamates, trithiocarbonates, and xanthates in order to mediate the polymerisation via for example a nitroxide mediated polymerisation (NMP), reversible addition fragmentation chain-transfer process (RAFT) or atom transfer radical polymerisation (ATRP).

In another embodiment polymer A is made via a bulk polymerisation process. Bulk polymerisation of olefinically unsaturated monomers is described in detail in EP 0,156, 170, WO 82/02387, and U.S. Pat. No. 4,414,370.

In general in a bulk polymerisation process a mixture of two or more monomers are charged continuously into a reactor zone containing molten vinyl polymer having the same ratio of vinyl monomers as the monomer mixture. The molten mixture is maintained at a preset temperature to provide a vinyl polymer of the desired molecular weight. The product is pumped out of the reaction zone at the same rates as the monomers are charged to the reaction zone to provide a fixed level of vinyl monomer and vinyl polymer in the system. The particular flow rate selected will depend upon the reaction temperature, vinyl monomers, desired molecular weight and desired polydispersity.

The minimum reaction temperature will vary, depending on the particular monomers charged to the reactor. In order to obtain a polymer A for use in the invention with the desired molecular weight the reaction temperature is preferably maintained from about 135° C. to about 310° C., more preferably from about 150° C. to 275° C. A conventional free-radical-yielding initiator may be used and optionally a chain transfer agent may be added to control the molecular weight.

Alternatively polymer A may be prepared by means of a suspension or micro-suspension polymerisation process. In this process, monomer and water are introduced into the polymerisation reactor and a polymerisation initiator, along with other chemical additives, are added to initiate the polymerisation reaction. The contents of the reaction vessel are continually mixed to maintain the suspension and ensure a uniform particle size of the resulting polymer.

Polymer A may also be made by a solution dispersion polymerisation or solvent assisted dispersion polymerisation (SAD) process where the polymerisation process can be carried out in the presence of an organic solvent. Typical organic solvents which may be used include aromatic hydrocarbons such as benzene toluene, and the xylenes, ethers such as diethyl ether, tetrahydrofuran, alkoxylated ethylene glycol; alcohols such as methanol, ethanol, propanol, butanol and alcohols with at least six carbons, such as octanol. and their esters with carboxylic acids such as acetic, propionic and butyric acids, ketones such as acetone or methyl ethyl ketone, and liquid tertiary amines such as pyridine. Mixtures of solvents may also be used. Typical solvents would certainly include alkyl glycols, such as butyl glycol or dipropylene glycol dimethyl ether (Dowanol DMM) or dipropylene glycol methyl ether (Dowanol DPM). An example of an aromatic solvent that is regularly used is Solvesso 100. Preferably bio-renewable solvents (for example as available from Liberty Chemicals) are used.

Preferably the compositions of the invention have VOC levels of less than 100 g/L and more preferably less than 80 g/L, most preferably less than 50 g/L and especially less than 20 g/L of volatile organic components such as coalescing solvents. Often the reaction temperature is around 140° C. to 160° C. and can also be a carried out at an elevated pressure so that lower boiling point solvents can be used. An advantage of lower boiling point solvents is that they can be more easily removed in order to make a low VOC aqueous composition.

Once polymer A is prepared then polymer B is prepared in the presence of polymer A and an aqueous composition is prepared by inter alia solubilising polymer A before during or after the preparation of polymer B. Polymer A can serve as an (co-)emulsifier for polymer B without which polymer B cannot be sufficiently dispersed in the aqueous composition of the invention. By (co-) emulsifier is meant that although polymer A acts as an emulsifier, additional emulsifiers may also be added.

Thus, polymer A contains a sufficient concentration of acid functionality or a high enough concentration of polyethylene glycol (meth)acrylates to render the polymer partially or more preferably fully soluble in aqueous media, if necessary by neutralization of acid groups of the polymer, as would e.g. be achieved by adjustment of the pH of the aqueous medium. (If the acid-functional polymer A is only partially soluble in the aqueous medium of the emulsion, it will exist therein partly dispersed and partly dissolved). Usually, the medium in which the polymer A finds itself will be acidic (pH<7) and the acid groups will be carboxyl groups so that dissolution and surface activity can be affected by raising the pH of the medium (usually the aqueous polymerisation medium in which the polymer A has been prepared) so as to neutralize the acid groups by the addition of a base, such as an organic or inorganic base, examples of which include organic amines such as trialkylamines (e.g. triethylamine, tributylamine), morpholine and alkanolamines, and inorganic bases such as ammonia, NaOH, KOH, and LiOH. Of course, the aqueous medium containing the acid functional polymer A may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pK 1 to 2) so that neutralization may not be necessary to achieve dissolution. Further still, it is possible for acid monomers to be polymerised in salt form rather than as the free acid.

The solubilisation of the polymer A is preferably effected before carrying out the polymerisation of step b). Solubilisation subsequent to the polymerisation to form the polymer B, could incur a worse MFFT/Koenig hardness balance as compared to solubilisation prior to making the polymer B.

Polymer A is present during the polymerisation process to make polymer B. Polymer B may be formed using a number of processes. These include emulsion polymerisation, bulk polymerisation and solution polymerisation.

An important preferred feature of the invention is that it is often possible to eliminate or much reduce the requirement for the addition of a surfactant to act as an emulsifier to make polymer B because polymer A itself can fulfil such a function (i.e. act as an emulsifying agent). Thus the aqueous composition of the invention preferably contains a very low level of such added emulsifier (not counting polymer A itself), with usually less than 0.5% (preferably less than 0.25%, and often zero) based on the total wt of monomers charged being used, and with the only surfactant present preferably being that remaining from polymer A polymerisation (not counting the polymer A itself). In fact the overall level of surfactant (not counting the polymer A itself) is preferably <1% more preferably <0.5%, particularly <0.35%, based on the total wt of monomers charged for polymer B.

The polymerisation to make polymer B could be carried out using a chain transfer agent, but (unlike in the preparation of polymer A) is usually effected without the use of such a material in order to ensure a higher molecular weight.

Polymer B may be considered as a hydrophobic polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer hydrophobic and water-insoluble throughout the pH range.

It will be appreciated that polymer A and optionally polymer B possess functional groups for imparting latent crosslinkability to the composition (i.e. so that crosslinking takes place e.g. after the formation of a coating there from) when combined with the crosslinking agent. For example, one or both polymers could carry functional groups such as hydroxyl groups and the composition subsequently formulated with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking with the functional crosslinker groups of the polymer A, and also the polymer B if present by virtue of forming covalent bonds.

If crosslinking monomers are present then preferably the amount of crosslinking agent that is employed is such that the ratio of the number of crosslinker groups present in the polymer A and (if employed) in the polymer B to the number of reactive groups (for crosslinking purposes) in the crosslinking agent is within the range of from 10/1 to 1/3, preferably 2/1 to 1/1.5.

The crosslinker is usually combined with the aqueous composition by adding it thereto after the preparation of polymer B (and sometimes just before use of the composition), although it may in principle also be combined by performing the polymerisation of polymer B in the presence of the crosslinking agent. A combination of both incorporation expedients may also in principle be used.

Adhesion promoting monomers include amino, urea, or N-heterocyclic groups. As known to those skilled in the art this property can also be achieved by immination i.e. reaction of the acid groups with propylene imine. Preferably vinyl polymer A comprises 0 to 6 wt % of at least one olefinically unsaturated monomer with a wet-adhesion promoting functionality, preferably 0.3 to 4 wt %.

According to an embodiment of the invention there is provided an aqueous polymer coating composition comprising at least:
  a) a vinyl polymer A, comprising:
    i) 4 to 25 wt % of acid-functional olefinically unsaturated monomers;
    ii) 0 to 15 wt % of carbonyl functional olefinically unsaturated monomers; and
    iii) 96 to 60 wt % of non-acid functional, non-crosslinking olefinically unsaturated monomers; said polymer A being obtained by an emulsion polymerisation process and having a weight average molecular weight within the range of from 3,000 to 65,000 g/mol, a Tg of at least 50° C. and an acid value >20 mgKOH/g; and
  b) a vinyl polymer B, made in the presence of neutralised polymer A and comprising:
    i) 0 to 4 wt %, more preferably 0 wt % of acid-functional olefinically unsaturated monomers;
    ii) 0 to 12 wt %, more preferably 1 to 8 wt % of crosslinking-functional olefinically unsaturated monomers; and
    iii) 100 to 84 wt % of non-acid functional, non-crosslinking olefinically unsaturated monomers;
    wherein polymer B has a weight average molecular weight of at least 80,000 g/mol and a Tg less than 50° C.;
    wherein between 10 and 100,%, preferably between 25 and 75% of the acid groups have been reacted with an alkylene imine, preferably ethylene imine or propylene imine, to promote adhesion, and
    where the wt % of polymer A is 10 to 60, more preferred 20 to 50 wt % based on the weight of polymer A and polymer B together.

According to an embodiment of the invention there is provided an aqueous polymer coating composition comprising at least:
  a) a vinyl polymer A, comprising:
    i) 4 to 25 wt % of acid-functional olefinically unsaturated monomers;
    ii) 0 to 15 wt % of carbonyl functional olefinically unsaturated monomers; and
    iii) 96 to 60 wt % of non-acid functional, non-crosslinking olefinically unsaturated monomers; said polymer A being obtained by an emulsion polymerisation process and having a weight average molecular weight within the range of from 3,000 to 65,000 g/mol, a Tg of at least 50° C. and an acid value >20 mgKOH/g; and
  b) a vinyl polymer B, made in the presence of neutralised polymer A and comprising:
    i) 0 to 4 wt %, more preferably 0 wt % of acid-functional olefinically unsaturated monomers;
    ii) 0 to 12 wt %, more preferably 1 to 8 wt % of crosslinking-functional olefinically unsaturated monomers; and
    iii) 100 to 84 wt % of non-acid functional, non-crosslinking olefinically unsaturated monomers;
    wherein polymer B has a weight average molecular weight of at least 80,000 g/mol and a Tg less than 50° C.; and where the wt % of polymer A is 10 to 60, more preferred 20 to 50 wt % based on the weight of polymer A and polymer B together.

The wt % of olefinically unsaturated monomers used to form polymer A are in the range of from 10 to 60, more preferably 20 to 50 wt % based on the weight of olefinically unsaturated monomers used to form polymer A and polymer B together.

According to an embodiment of the invention there is provided a process for the production of the aqueous polymer coating composition, which process comprises steps:
1) a first polymerisation step, to form polymer A;
2) a second polymerisation step in the presence of the resulting polymer A from step 1) to form polymer B;
3) a neutralisation step before/after or during step 2) to solubilise polymer A;
4) the optional addition of a crosslinking agent after the polymerisation step a) and/or step 2), said crosslinking agent being reactable with any crosslinking functional groups of the polymer A and/or polymer B on subsequent drying of the coating composition to effect covalent bond crosslinking.

In a preferred embodiment the acid functional monomer in polymer A is selected from acrylic acid; methacrylic acid, crotonic acid, itaconic anhydride and itaconic acid; the crosslinking functional monomer used in both polymer A and polymer B is diacetone acrylamide and the crosslinker is adipic acid dihydrazide.

According to another embodiment of the invention there is provided a process for the production of the aqueous polymer coating composition, which process comprises steps:
1) where vinyl polymer A is made by an emulsion polymerisation process,
2) a subsequent neutralisation step; and
3) where subsequently polymer B is made by polymerisation in the presence of polymer A;
wherein both vinyl polymer A and vinyl polymer B comprise at least one carbonyl functional olefinically unsaturated monomer;
wherein the acid value of vinyl polymer A is between 30 and 110 mgKOH/g and the acid value of vinyl polymer B is below 10 mgKOH/g, more preferred below 5 mgKOH/g; and wherein the crosslinker is an aliphatic dihydrazide.

According to yet another embodiment of the invention there is provided a process for the production of the aqueous polymer coating composition, which process comprises steps:
1) where polymer A is made by a bulk polymerisation process and more preferably a continuous bulk polymerisation process,
2) where polymer A is dissipated in water and (partially) neutralised, preferably with an organic amine or NaOH, KOH or LiOH; and
3) where subsequently polymer B is made by polymerisation in an aqueous medium in the presence of the neutralised polymer A;
wherein the acid value of vinyl polymer A is between 40 and 300 mgKOH/g of solid polymer;
wherein polymer A has a Tg of at least 70° C. and more preferably at least 90° C.; and
wherein polymer A has a weight average molecular weight in the range of from 2,000 to 25,000 g/mol.

According to yet a further embodiment of the invention there is provided a process for the production of the aqueous polymer coating composition, which process comprises steps:
1) where polymer A is made by solution polymerisation, preferably in a solvent selected from the group consisting of acetone, methyl ethylketone, ethanol, isopropanol or mixtures thereof;
2) a subsequent neutralisation step comprising neutralising at least part of the acid groups with a base (preferably an organic amine), adding water and emulsifying polymer A;
3) where subsequently polymer B is made by emulsion polymerisation in the presence of polymer A;
4) where the solvent is removed by evaporation;
wherein polymer A has a Tg of at least 50° C.,
wherein polymer B has a Tg of no more than 50° C., and
wherein polymer A and polymer B have a glass transition temperature difference of at least 25° C.

Preferably the average particle size of the aqueous composition of the invention is between 70 and 140 nm.

The solids content of an aqueous composition of the invention is usually within the range of from about 20 to 65 wt % on a total weight basis, more usually 30 to 55 wt %. Solids content can, if desired, be adjusted by adding water or removing water (e.g. by distillation or ultrafiltration).

The aqueous compositions of the invention may be used in various applications and for such purposes may be optionally further combined or formulated with other additives or components, such as defoamers, rheology control agents, thickeners, dispersing and stabilizing agents (usually surfactants), wetting agents, fillers, extenders, fungicides, bactericides, coalescing and wetting solvents (although solvents are not normally required), plasticisers, anti-freeze agents, waxes and pigments. The composition may also be blended with other polymers such as vinyl polymers, alkyds (saturated or unsaturated), polyesters and or polyurethanes.

The aqueous compositions may be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper and metal substrates.

The compositions once applied may be allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

In yet another preferred embodiment of the invention there is provided a coating composition comprising opacifiers, which may include titanium dioxide, calcium carbonate and Ropaque™ (ex. Dow).

In a preferred coating composition, the binder component as described in the preferred embodiment above, comprising itaconate monomers, is combined with hollow particle opacifiers. Possible examples include Ropaque™ hollow particles such as ULTRA, Ropaque™ ULTRA E, Ropaque™ ULTRA EF, or Ropaque™ DUAL, all supplied by DOW.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises as a coating composition.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "RCE≡"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies an organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, π(pi)-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate.

The present invention is now further illustrated, but in no way limited, by reference to the following examples. Unless otherwise specified all parts, percentages, and ratios are on a weight basis. The prefix C before an example indicates that it is comparative.

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

MMA=methyl methacrylate (may be prepared using biorenewable alkanols)
MAA=methacrylic acid (may be biorenewable)
BMA=n-butyl methacrylate (may be prepared using biorenewable alkanols)
BA=n-butyl acrylate (may be biorenewable)
EDTA=ethylenediamine tetraacetic acid
DMI=dimethyl itaconate (bio-renewable)
MFFT The minimum film forming temperature (MFFT) of a composition as used herein is the temperature where the composition forms a smooth and crack-free coating or film using DIN 53787 and when applied using a Sheen MFFT bar SS3000.

Koenig Hardness

Koenig hardness as used herein is a standard measure of hardness, being a determination of how the viscoelastic properties of a film formed from the composition slows down a swinging motion deforming the surface of the film, and is measured according to DIN 53157 NEN5319.

Glass Transition Temperature

As is well known, the glass transition temperature of a polymer is the temperature at which it changes from a glassy, brittle state to a plastic, rubbery state.

The glass transition temperatures may be determined experimentally using differential scanning calorimetry DSC, taking the peak of the derivative curve as Tg, or calculated from the Fox equation. Thus the Tg, in degrees Kelvin, of a copolymer having "n" copolymerised comonomers is given by the wt fractions W of each comonomer type and the Tg's of the homopolymers (in degrees Kelvin) derived from each comonomer according to the equation:

$$1 = \underline{W}_1 + \underline{W}_2 + \ldots \underline{W}_n$$

$$\overline{Tg} \quad \overline{TG}_1 \quad \overline{Tg}_2 \quad \overline{Tg}_n$$

The calculated Tg in degrees Kelvin may be readily converted to ° C.

Determination of Molecular Weight of a Polymer:

The molecular weight of a polymer may be determined using Size Exclusion Chromatography with tetrahydrofuran as the eluent or with 1,1,1,3,3,3 hexafluoro isopropanol as the eluent.

1) Tetrahydrofuran

The SEC analyses were performed on an Alliance Separation Module (Waters 2690), including a pump, autoinjector, degasser, and column oven. The eluent was tetrahydrofuran (THF) with the addition of 1.0 vol % acetic acid. The injection volume was 150 µl. The flow was established at 1.0 ml/min. Three PL MixedB (Polymer Laboratories) with a guard column (3 µm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millenium 32 software (Waters) with a third order calibration curve. The obtained molar masses are polystyrene equivalent molar masses (g/mol).

2) 1,1,1,3,3,3 Hexafluoro Isopropanol

The SEC analyses were performed on a Waters Alliance 2695 (pump, degasser and autosampler) with a Shodex R1-101 differential refractive index detector and Shimadzu CTO-20AC column oven. The eluent was 1,1,1,3,3,3 hexafluoro isopropanol (HFIP) with the addition of 0.2M potassium trifluoro actetate (KTFA). The injection volume was 50 µl. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

EXAMPLE 1

Vinyl Polymer 1A

To a round-bottomed flask equipped with a condenser, thermometer and mechanical stirrer 1087.6 parts of water and 1.3 parts of Aerosol GPG were charged. This mixture was heated to 70° C. At 70° C. 10% of a monomer feed consisting of 211.7 parts of water, 357.9 parts of methyl methacrylate, 39.0 parts of diacetone acrylamide, 32.2 parts of methacrylic acid, 59.0 parts of ethyl acrylate, 3.9 parts of Aerosol GPG, and 11.7 parts of lauryl mercaptane was added and the reactor contents were further heated to 85° C. At 80° C. a solution consisting of 0.4 parts of ammonium persulphate and 28.8 parts of water was added.

At 85° C., the remainder of the monomer feed was added over a period of 60 minutes. A catalyst feed, comprising 1.0 parts of ammonium persulphate and 67.3 parts of water was fed to the reactor in period of 70 minutes. At the end of the addition of the monomer feed 31.3 parts of water were used to rinse the feed tank and were added to the reactor. A temperature of 85° C. was maintained for 20 minutes after which the reaction mixture was cooled to 80° C. At 80° C. the emulsion was neutralised using 24.4 parts of a 25% solution of ammonia in water mixed with 41.4 parts of water. The reaction mixture was subsequently kept at 80° C. for another 20 minutes before it was cooled to room temperature.

The resulting emulsion had a solids content of 25.3% and a pH of 7.9.

Vinyl Polymer 2B

To a round-bottomed flask equipped with a condenser, thermometer and mechanical stirrer were added: 43.7 parts of water, 3.6 parts of a 30 wt % solution of sodium lauryl sulphate in water, and 859.5 parts of a vinyl polymer prepared as described in Vinyl Polymer 1A above. The contents of the reactor were heated to 30° C.

50% of a monomer feed consisting of 24.0 parts of water, 175.4 parts of methyl methacrylate, 363.3 parts of butyl acrylate, and 10.8 parts of diacetone acrylamide was added after which the emulsion was stirred for 5 minutes. Next, 0.3 parts of a 70 wt % slurry of t-butyl hydroperoxide, 4.0 parts of water and 0.1 parts of a 1 wt % solution of FeEDTA were added, followed by 40% of a solution of 0.9 parts of ascorbic acid in 26.2 parts of water. After the temperature had reached 74° C., the batch was stirred for 10 minutes and cooled to 45° C. Next, the remainder of the monomer feed was added, followed by 195.5 parts of water, and the emulsion was allowed to stir for 15 minutes. A slurry of 0.3 parts of a 70 wt % slurry of t-butyl hydroperoxide, 4.0 parts of water was added followed by the remainder of the i-ascorbic acid solution.

The temperature reached 66° C. after which the mixture was mixed for another 10 minutes. The batch was cooled to 60° C. and a slurry of 0.8 parts of a 70 wt % slurry of t-butyl hydroperoxide and 1.1 parts of water was added followed by a solution of 0.5 parts of i-ascorbic acid in 7.9 parts of water. The mixture was stirred for 15 minutes.

The batch was cooled to 30° C. and 10.7 parts of adipic dihydrazide and 2.8 parts of water were added. The solids content of the emulsion was corrected to 44% using water.

The resulting emulsion had a solids content of 44.0% and a pH of 7.4.

EXAMPLE 2

Vinyl Polymer 2A

To a round-bottomed flask equipped with a condenser, thermometer and mechanical stirrer 1357.2 parts of water and 3.8 parts of a 30 wt % solution in water of sodium lauryl sulphate were charged. This mixture was heated to 85° C. At 70° C. and then 10% of a monomer feed was added, the feed consisting of 215.3 parts of water, 181.0 parts of methyl methacrylate, 30.5 parts of methacrylic acid, 34.9 parts of ethyl acrylate, 333.0 parts of dimethyl itaconate, 61.0 parts of diacetone acrylamide, 11.4 parts of a 30 wt % solution in water of sodium lauryl sulphate, and 14.6 parts of 3-mercaptopropionic acid. The reactor contents were further heated to 85° C. At 80 C 30% of a catalyst solution consisting of 3.8 parts of ammonium persulphate and 120.2 parts of water was added. At 85° C., the remainder of the monomer feed was added over a period of 60 minutes and the remainder of the catalyst feed was fed over a period of 70 minutes. At the end of the addition of the monomer feed 39.2 parts of water were used to rinse the feed tank and were added to the reactor. A temperature of 85° C. was maintained for 20 minutes after which the reaction mixture was cooled to 80° C. At 80° C. the emulsion was neutralised using 24.0 parts of a 25% solution of ammonia in water mixed with 72.0 parts of water. The reaction mixture was subsequently kept at 80° C. for another 20 minutes before it was cooled to room temperature.

The resulting emulsion had a solids content of 25.2% and a pH of 8.1.

Vinyl Polymer 2B

To a round-bottomed flask equipped with a condenser, thermometer and mechanical stirrer was added: 157.6 parts of water and 898.5 parts of a vinyl polymer prepared as described in Vinyl Polymer 2A above. The contents of the reactor were heated to 30° C.

50% of a monomer feed consisting of 297.9 parts of dimethyl itaconate, 248.1 parts of butyl acrylate, and 16.9 parts of diacetone acrylamide was added after which the emulsion was stirred for 5 minutes. Next, 0.3 parts of a 70 wt % slurry of t-butyl hydroperoxide, 4.1 parts of water and 0.3 parts of a 1 wt % solution of FeEDTA were added, followed by 40% of a solution of 0.9 parts of i-ascorbic acid in 24.9 parts of water.

After the temperature had reached 56° C., the batch was stirred for 10 minutes and cooled to 50° C. Next, the remainder of the monomer feed was added, followed by 79.9 parts of water, and the emulsion was allowed to stir for 15 minutes. A slurry of 0.3 parts of a 70 wt % slurry of t-butyl hydroperoxide, 4.1 parts of water was added followed by the remainder of the i-ascorbic acid solution.

The temperature reached 69° C. after which the mixture was mixed for another 10 minutes. The batch was cooled to 60° C. and a slurry of 0.4 parts of a 70 wt % slurry of t-butyl hydroperoxide and 1.2 parts of water was added followed by a solution of 0.3 parts of i-ascorbic acid in 8.3 parts of water. The mixture was stirred for 15 minutes.

The batch was cooled to 30° C. and 2.2 parts of water were added. The solids content of the emulsion was corrected to 44% using water.

The resulting emulsion had a solids content of 44.0% and a pH of 7.7

EXAMPLE 3

Oligomer 3A

To a round-bottomed flask equipped with a condenser, thermometer and mechanical stirrer 459.4 parts of water and 0.9 parts of a 30 wt-% solution of sodium lauryl sulphate were charged. This mixture was heated to 70° C. At 70° C. 10 of a monomer feed consisting of 88 parts of water, 71.0 parts of methyl methacrylate, 106.5 parts of dimethyl itaconate, 16.5 parts of diacetone acrylamide, 12.4 parts of methacrylic acid, 0.26 parts of a 30 wt-% solution of sodium lauryl sulphate, 0.8 parts of 3-mercaptopropionic acid and 1.7 parts of lauryl mercaptane was added and the reactor contents were further heated to 85° C. At 80° C. a solution consisting of 0.2 parts of ammonium persulphate and 8.0 parts of water was added.

At 85° C., the remainder of the monomer feed was added over a period of 240 minutes. A catalyst feed, comprising 0.4 parts of ammonium persulphate and 28.5 parts of water was fed to the reactor in period of 240 minutes. At the end of the addition of the monomer feed 7.7 parts of water were used to rinse the feed tank and were added to the reactor. A temperature of 85° C. was maintained for 20 minutes after which the reaction mixture was cooled to 80° C. At 80° C. the emulsion was neutralized using 11.1 parts of a 25% solution of ammonia in water mixed with 12.2 parts of water. The reaction mixture was subsequently kept at 80° C. for another 20 minutes before it was cooled to room temperature. The solids content of the emulsion was adjusted to 25% using water.

The resulting emulsion had a solids content of 25.0% and a pH of 8.8.

Polymer Emulsion 3B

To a round-bottomed flask equipped with a condenser, thermometer and mechanical stirrer were added 688.9 parts of an oligomer prepared as described in Oligomer 3A above. The contents of the reactor were heated to 65° C. 50% of a monomer feed consisting of 9.7 parts of water, 100.9 parts of butyl methacrylate, 47.9 parts of butyl acrylate, 98.4 parts of styrene and 4.4 parts of diacetone acrylamide was added after which the emulsion was stirred for 5 minutes. Next, 0.9 parts of a 70 wt-% slurry of t-butyl hydroperoxide, and 1.2 parts of water were added, followed by 40% of a solution of 0.8 parts of i-ascorbic acid in 8.3 parts of water. After the temperature had reached 77° C., the batch was stirred for 10 minutes and cooled to 45° C. Next, the remainder of the monomer feed was added, followed by 7.6 parts of water, and the emulsion was allowed to stir for 15 minutes. Next, the remainder of the i-ascorbic acid solution was added.

The temperature reached 76° C. after which the mixture was mixed for another 10 minutes. The batch was cooled to 60° C. and 16.0 parts of water were added. The mixture was stirred for 15 minutes. The batch was cooled to 30° C. and 7.3 parts of adipic dihydrazide and 1.9 parts of water were added. The solids content of the emulsion was corrected to 40% using water.

The resulting emulsion had a solids content of 44.0% and a pH of 7.9.

EXAMPLE 4

Oligomer 4A

To a round-bottomed flask equipped with a condenser, thermometer and mechanical stirrer 459.4 parts of water and 0.9 parts of a 30 wt-% solution of sodium lauryl sulphate were charged. This mixture was heated to 70° C. At 70° C. 10 of a monomer feed consisting of 88 parts of water, 71.0 parts of methyl methacrylate, 106.5 parts of diethyl itaconate, 16.5 parts of diacetone acrylamide, 12.4 parts of methacrylic acid, 0.26 parts of a 30 wt-% solution of sodium lauryl sulphate, 0.8 parts of 3-mercaptopropionic acid and 1.7 parts of lauryl mercaptane was added and the reactor contents were further heated to 85° C. At 80° C. a solution consisting of 0.2 parts of ammonium persulphate and 8.0 parts of water was added.

At 85° C., the remainder of the monomer feed was added over a period of 240 minutes. A catalyst feed, comprising 0.4 parts of ammonium persulphate and 28.5 parts of water was fed to the reactor in period of 240 minutes. At the end of the addition of the monomer feed 7.7 parts of water were used to rinse the feed tank and were added to the reactor. A temperature of 85° C. was maintained for 20 minutes after which the reaction mixture was cooled to 80° C. At 80° C. the emulsion was neutralized using 11.1 parts of a 25% solution of ammonia in water mixed with 12.2 parts of water. The reaction mixture was subsequently kept at 80° C. for another 20 minutes before it was cooled to room temperature. The solids content of the emulsion was adjusted to 25% using water.

The resulting emulsion had a solids content of 25.0% and a pH of 8.7.

Polymer emulsion 4B

To a round-bottomed flask equipped with a condenser, thermometer and mechanical stirrer were added: 688.9 parts of an oligomer prepared as described in Oligomer 4A above. The contents of the reactor were heated to 65° C. Then 50% of a monomer feed consisting of 9.7 parts of water, 100.9 parts of butyl methacrylate, 47.9 parts of butyl acrylate, 98.4 parts of styrene and 4.4 parts of diacetone acrylamide was added after which the emulsion was stirred for 5 minutes. Next, 0.9 parts of a 70 wt-% slurry of t-butyl hydroperoxide, and 1.2 parts of water were added, followed by 40 of a solution of 0.8 parts of i-ascorbic acid in 8.3 parts of water. After the temperature had reached 75° C., the batch was stirred for 10 minutes and cooled to 45° C. Next, the remainder of the monomer feed was added, followed by 7.6 parts of water, and the emulsion was allowed to stir for 15 minutes. Next, the remainder of the i-ascorbic acid solution was added. The temperature reached 74° C. after which the mixture was mixed for another 10 minutes. The batch was cooled to 60° C. and 16.0 parts of water were added. The mixture was stirred for 15 minutes.

The batch was cooled to 30° C. and 7.3 parts of adipic dihydrazide and 1.9 parts of water were added. The solids content of the emulsion was corrected to 40% using water.

The resulting emulsion had a solids content of 44.0% and a pH of 8.0.

EXAMPLE 5

Oligomer 5A

To a round-bottomed flask equipped with a condenser, thermometer and mechanical stirrer 549.0 parts of water and 0.7 parts of Aerosol GPG were charged. This mixture was heated to 70° C. At 70° C. 10% of a monomer feed consisting of 100.8 parts of water, 126.2 parts of methyl methacrylate, 54.1 parts of diethyl itaconate, 24.3 parts of butyl methacrylate, 14.6 parts of diacetone acrylamide, 24.3 parts of methacrylic acid, 2.0 parts of Aerosol GPG, and 5.8 parts of 3-mercaptopropionic acid was added and the reactor contents were further heated to 85° C. At 80° C. a solution consisting of 0.2 parts of ammonium persulphate and 11.3 parts of water was added.

At 85° C., the remainder of the monomer feed was added over a period of 260 minutes. A catalyst feed, comprising 0.5 parts of ammonium persulphate and 33.5 parts of water was fed to the reactor in period of 250 minutes. At the end of the addition of the monomer feed 5.0 parts of water were used to rinse the feed tank and were added to the reactor. A temperature of 85° C. was maintained for 20 minutes after which the reaction mixture was cooled to 80° C. At 80° C. the emulsion was neutralized using 19.4 parts of a 25% solution of ammonia in water mixed with 21.2 parts of water. The reaction mixture was subsequently kept at 80° C. for another 20 minutes before it was cooled to room temperature. The solids content of the emulsion was adjusted to 25% with water.

The resulting emulsion had a solids content of 25.1% and a pH of 8.0.

Polymer emulsion 5B

To a round-bottomed flask equipped with a condenser, thermometer and mechanical stirrer were added 15.2 parts of water and 498.1 parts of an oligomer prepared as described in Oligomer 5A above. The contents of the reactor were heated to 60° C. Then 33% of a monomer feed was added, the feed consisting of 13.9 parts of water, 13.9 parts of diethyl itaconate, 156.0 parts of di-iso-octyl itaconate, 135.9 parts of butyl acrylate, and 6.2 parts of diacetone acrylamide. After the feed had been added the emulsion was stirred for 15 minutes and 0.4 parts of a 70 wt-% slurry of t-butyl hydroperoxide, and 1.2 parts of water was added, followed by 33% of a solution of 0.7 parts of i-ascorbic acid in 13.8 parts of water.

After the temperature had reached 66° C., the batch was stirred for 10 minutes, 45.5 parts of water were added and the batch was cooled to 60° C. Next, 50% of the remaining monomer feed was added, followed by 0.4 parts of a 70 wt-% slurry of t-butyl hydroperoxide, 1.2 parts of water, and 50% of the remaining i-ascorbic acid solution. After the temperature had reached 62° C., the batch was stirred for 10 minutes, 56.4 parts of water were added and the batch was cooled to 60° C. The remainder of the monomer feed and 5.1 parts of water were added, followed by 0.4 parts of a 70 wt-% slurry of t-butyl hydroperoxide, 1.8 parts of water, and the remaining i-ascorbic acid solution.

After the temperature had reached 61° C. after approximately 15 minutes, the batch was stirred for an additional 10 minutes. Next, 0.5 parts of a 70 wt-% slurry of t-butyl hydroperoxide, and 0.7 parts of water were added, followed by a solution of 0.3 parts of i-ascorbic acid in 4.6 parts of water. After the emulsion was allowed to stir for 30 minutes, the batch was cooled to 30° C. after which 6.2 parts of adipic dihydrazide and 17.8 parts of water were added. The solids content of the emulsion was corrected to 44% using water.

The resulting emulsion had a solids content of 44.0% and a pH of 7.8.

EXAMPLE 6

Vinyl Polymer 6A

To a round-bottomed flask equipped with a condenser, thermometer and mechanical stirrer 1087.6 parts of water and 1.3 parts of Aerosol GPG were charged. This mixture was heated to 70° C. At 70° C. 10% of a monomer feed consisting of 211.7 parts of water, 307.4 parts of methyl methacrylate, 122.0 parts of styrene, 39.0 parts of diacetone acrylamide, 39.0 parts of methacrylic acid, 107.4 parts of -methylene valerolactone, 3.9 parts of Aerosol GPG, and 11.7 parts of lauryl mercaptane was added and the reactor contents were further heated to 85° C. At 80° C. a solution consisting of 0.4 parts of ammonium persulphate and 28.8 parts of water was added.

At 85° C., the remainder of the monomer feed was added over a period of 60 minutes. A catalyst feed, comprising 1.0 parts of ammonium persulphate and 67.3 parts of water was fed to the reactor in period of 70 minutes. At the end of the addition of the monomer feed 31.3 parts of water were used to rinse the feed tank and were added to the reactor. A temperature of 85° C. was maintained for 20 minutes after which the reaction mixture was cooled to 80° C. At 80° C. the emulsion was neutralised using 24.4 parts of a 25% solution of ammonia in water mixed with 41.4 parts of water. The reaction mixture was subsequently kept at 80° C. for another 20 minutes before it was cooled to room temperature. The resulting emulsion had a solids content of 25.3% and a pH of 8.0.

Vinyl Polymer 6B

To a round-bottomed flask equipped with a condenser, thermometer and mechanical stirrer were added: 43.7 parts of water, 3.6 parts of a 30 wt % solution of sodium lauryl sulphate in water, and 859.5 parts of a vinyl polymer prepared as described in Vinyl Polymer 1A above. The contents of the reactor were heated to 30° C.

50% of a monomer feed consisting of 24.0 parts of water, 175.4 parts of methyl methacrylate, 363.3 parts of butyl acrylate, and 10.8 parts of diacetone acrylamide was added after which the emulsion was stirred for 5 minutes. Next, 0.3 parts of a 70 wt % slurry of t-butyl hydroperoxide, 4.0 parts of water and 0.1 parts of a 1 wt % solution of FeEDTA were added, followed by 40% of a solution of 0.9 parts of ascorbic acid in 26.2 parts of water.

After the temperature had reached 74° C., the batch was stirred for 10 minutes and cooled to 45° C. Next, the remainder of the monomer feed was added, followed by 195.5 parts of water, and the emulsion was allowed to stir for 15 minutes. A slurry of 0.3 parts of a 70 wt % slurry of t-butyl hydroperoxide, 4.0 parts of water was added followed by the remainder of the i-ascorbic acid solution.

The temperature reached 66° C. after which the mixture was mixed for another 10 minutes. The batch was cooled to 60° C. and a slurry of 0.8 parts of a 70 wt % slurry of t-butyl hydroperoxide and 1.1 parts of water was added followed by a solution of 0.5 parts of i-ascorbic acid in 7.9 parts of water. The mixture was stirred for 15 minutes.

The batch was cooled to 30° C. and 10.7 parts of adipic dihydrazide and 2.8 parts of water were added. The solids content of the emulsion was corrected to 44% using water.

The resulting emulsion had a solids content of 44.0% and a pH of 7.5.

EXAMPLE 7

Vinyl Polymer 7A

To a round-bottomed flask equipped with a condenser, thermometer and mechanical stirrer 1057.5 parts of water, 30.1 parts of acrylic acid and 1.3 parts of Aerosol GPG were charged. This mixture was heated to 70° C. At 70° C. 10% of a monomer feed consisting of 211.7 parts of water, 429.4 parts of methacrylate, 39.0 parts of diacetone acrylamide, 39.0 parts of methacrylic acid, 107.4 parts of diethyl methylidene malonate, 3.9 parts of Aerosol GPG, and 11.7 parts of lauryl mercaptane was added and the reactor contents were further heated to 85° C. Prior to this addition, pH of the monomer feed was checked being 2.4. At 80° C. a solution consisting of 0.4 parts of ammonium persulphate and 28.8 parts of water was added.

At 85° C., the remainder of the monomer feed was added over a period of 60 minutes. A catalyst feed, comprising 1.0 parts of ammonium persulphate and 67.3 parts of water was fed to the reactor in period of 70 minutes. At the end of the addition of the monomer feed 31.3 parts of water were used to rinse the feed tank and were added to the reactor. A temperature of 85° C. was maintained for 20 minutes after which the reaction mixture was cooled to 80° C. At 80° C. the emulsion was neutralised using 24.4 parts of a 25% solution of ammonia in water mixed with 41.4 parts of water. The reaction mixture was subsequently kept at 80° C. for another 20 minutes before it was cooled to room temperature.

The resulting emulsion had a solids content of 25.3% and a pH of 7.7.

Vinyl polymer 7B

To a round-bottomed flask equipped with a condenser, thermometer and mechanical stirrer were added: 43.7 parts of water, 3.6 parts of a 30 wt % solution of sodium lauryl sulphate in water, and 859.5 parts of a vinyl polymer prepared as described in Vinyl Polymer 1A above. The contents of the reactor were heated to 30° C.

50% of a monomer feed consisting of 24.0 parts of water, 175.4 parts of methyl methacrylate, 363.3 parts of butyl acrylate, and 10.8 parts of diacetone acrylamide was added after which the emulsion was stirred for 5 minutes. Next, 0.3 parts of a 70 wt % slurry of t-butyl hydroperoxide, 4.0 parts of water and 0.1 parts of a 1 wt % solution of FeEDTA were added, followed by 40% of a solution of 0.9 parts of i-ascorbic acid in 26.2 parts of water.

After the temperature had reached 74° C., the batch was stirred for 10 minutes and cooled to 45° C. Next, the remainder of the monomer feed was added, followed by 195.5 parts of water, and the emulsion was allowed to stir for 15 minutes. A slurry of 0.3 parts of a 70 wt % slurry of t-butyl hydroperoxide, 4.0 parts of water was added followed by the remainder of the i-ascorbic acid solution.

The temperature reached 66° C. after which the mixture was mixed for another 10 minutes. The batch was cooled to 60° C. and a slurry of 0.8 parts of a 70 wt % slurry of t-butyl hydroperoxide and 1.1 parts of water was added followed by a solution of 0.5 parts of i-ascorbic acid in 7.9 parts of water. The mixture was stirred for 15 minutes.

The batch was cooled to 30° C. and 10.7 parts of adipic dihydrazide and 2.8 parts of water were added. The solids content of the emulsion was corrected to 44% using water. The resulting emulsion had a solids content of 44.0% and a pH of 7.3.

The invention claimed is:

1. An aqueous vinyl polymer coating composition comprising at least:
   a) a vinyl polymer A, comprising:
      i) 1 to 45 wt % of acid-functional olefinically unsaturated monomers;
      ii) 0 to 20 wt % of crosslinking-functional olefinically unsaturated monomers; and
      iii) 99 to 50 wt % of non-acid functional, non-crosslinking monomers selected from the group consisting of olefinically unsaturated monomers and arylalkylene monomers;
      where the weight percentages of each of (a)(i), (a)(ii) and (a)(iii) are calculated based on the total of (a)(i)+(a)(ii)+(a)(iii)=100%; and where
      said polymer A having a weight average molecular weight within the range of from 1,000 to 150,000 g/mol and an acid value >5 mgKOH/g; and
   b) a vinyl polymer B, comprising:
      i) 0 to 5 wt % of acid-functional olefinically unsaturated monomers;
      ii) 0 to 25 wt % of crosslinking-functional olefinically unsaturated monomers; and
      iii) 100 to 75 wt % of non-acid functional, non-crosslinking monomers selected from the group consisting of olefinically unsaturated monomers and arylalkylene monomers;
      where the weight percentages of each of (b)(i), (b)(ii) and (b)(iii) are calculated based on the total of (b)(i)+(b)(ii)+(b)(iii)=100%; and where
      said polymer B having a weight average molecular weight of at least 80,000 g/mol and an acid value <35 mg KOH/g; wherein
   I) the weight % of olefinically unsaturated and arylalkylene monomers used to form polymer A and polymer B when calculated based on the total amount of (a)(i)+(a)(ii)+(a)(iii)+(b)(i)+(b)(ii)+(b)(iii) being 100% are in a respective ratio of 5:75 to 95:25;
   II) at least 10% by weight of the total amount of monomers (a)(i)+(a)(ii)+(a)(iii)+(b)(i)+(b)(ii)+(b)(iii) used to form polymer A and polymer B is derived from at least one bio-renewable olefinically unsaturated monomer such that the amount of C14 isotope in the polymer A and/or the polymer B comprise at least about 1.5 dpm/gC of carbon-14;
   III) the acid value of polymer A is greater than the acid value of polymer B by at least 10 mgKOH;
   IV) polymer A and polymer B have a glass transition temperature difference of at least 20° C.;
   V) polymer B is prepared in the presence of polymer A;
   VI) said coating composition on drying has a Koenig hardness of at least 20 sec; and
   VII) said coating composition has a minimum film forming temperature of <55° C.

2. The composition according to claim 1, wherein the acid-functional monomer is selected from the group consisting of acrylic acid, methacrylic acid, itaconic anhydride, methylene malonic acid, itaconic acid, crotonic acid and fumaric acid.

3. The composition according to claim 1, wherein the bio-renewable olefinically unsaturated monomer is at least one monomer selected from the group consisting bio-renewable (meth)acrylic acid and bio-renewable alkyl (meth)acrylate.

4. The composition according to claim 1, wherein the bio-renewable olefinically unsaturated monomer is at least one monomer selected from the group consisting of α-methylene butyrolactone, α-methylene valerolactone, α-methylene γ-$R^1$ butyrolactone wherein $R^1$ can be an optionally substituted alkyl or optionally substituted aryl; dialkyl itaconates; monoalkyl itaconates, itaconic acid, itaconic anhydride, crotonic acid and alkyl esters thereof, citraconic acid and alkyl esters thereof, methylene malonic acid and mono and dialkyl esters thereof, citraconic anhydride, and mesaconic acid and alkyl esters thereof.

5. The composition according to claim 4, wherein the bio-renewable olefinically unsaturated monomer is at least one monomer selected from the group consisting of N—$R^2$, α-methylene butyrolactam wherein $R^2$ can be an optionally substituted alkyl or optionally substituted aryl; N—$R^2$, α-methylene γ-$R^1$ butyrolactam; N-alkyl itaconimids; itaconmonoamids; itacondiamids; dialkyl itaconamides, mono alkyl itaconamides; furfuryl (meth)acrylate; and fatty acid functional (meth)acrylates.

6. The composition according to claim 1, which further comprises a crosslinking agent which is reactable with any crosslinking functional group of the polymer A and/or the polymer B on subsequent drying of the coating composition to effect covalent bond crosslinking.

7. The composition according to claim 6, wherein the functional groups to provide crosslinking are selected from the group consisting of epoxy groups, hydroxyl groups, ketone groups and aldehyde groups.

8. The composition according to claim 6, wherein depending on the crosslinking functionality in the polymer A and in the polymer B, the crosslinking agent is selected from the group consisting of a polyisocyanate, melamine, glycoluril, a polyamine, and a polyhydrazide.

9. The composition according to claim 1, wherein the composition has less than 2 wt % of added surfactant by weight of monomers used to make the vinyl polymer A and the vinyl polymer B.

10. The composition according to claim 1, having a VOC level of less than 100 g/L.

11. The composition according to claim 1, wherein the acid value of the polymer B is <10 mg KOH/g.

12. The composition according to claim 1, wherein the ratio of the olefinically unsaturated monomer to the arylalkylene monomer is 5:70 to 95:30.

13. The composition according to claim 1, wherein at least 20% by weight of the total amount of monomers (a)(i)+(a)(ii)+(a)(iii)+(b)(i)+(b)(ii)+(b)(iii) used to form polymer A and polymer B is derived from the at least one bio-renewable olefinically unsaturated monomer.

14. A film, polish, varnish, lacquer, paint, ink or adhesive comprising a composition according to claim 1.

15. A coated substrate comprising a substrate selected from the group consisting of wood, plastic, paper and metal, and a protective coating comprising the composition according to claim 1 on the substrate.

* * * * *